Figure 1:
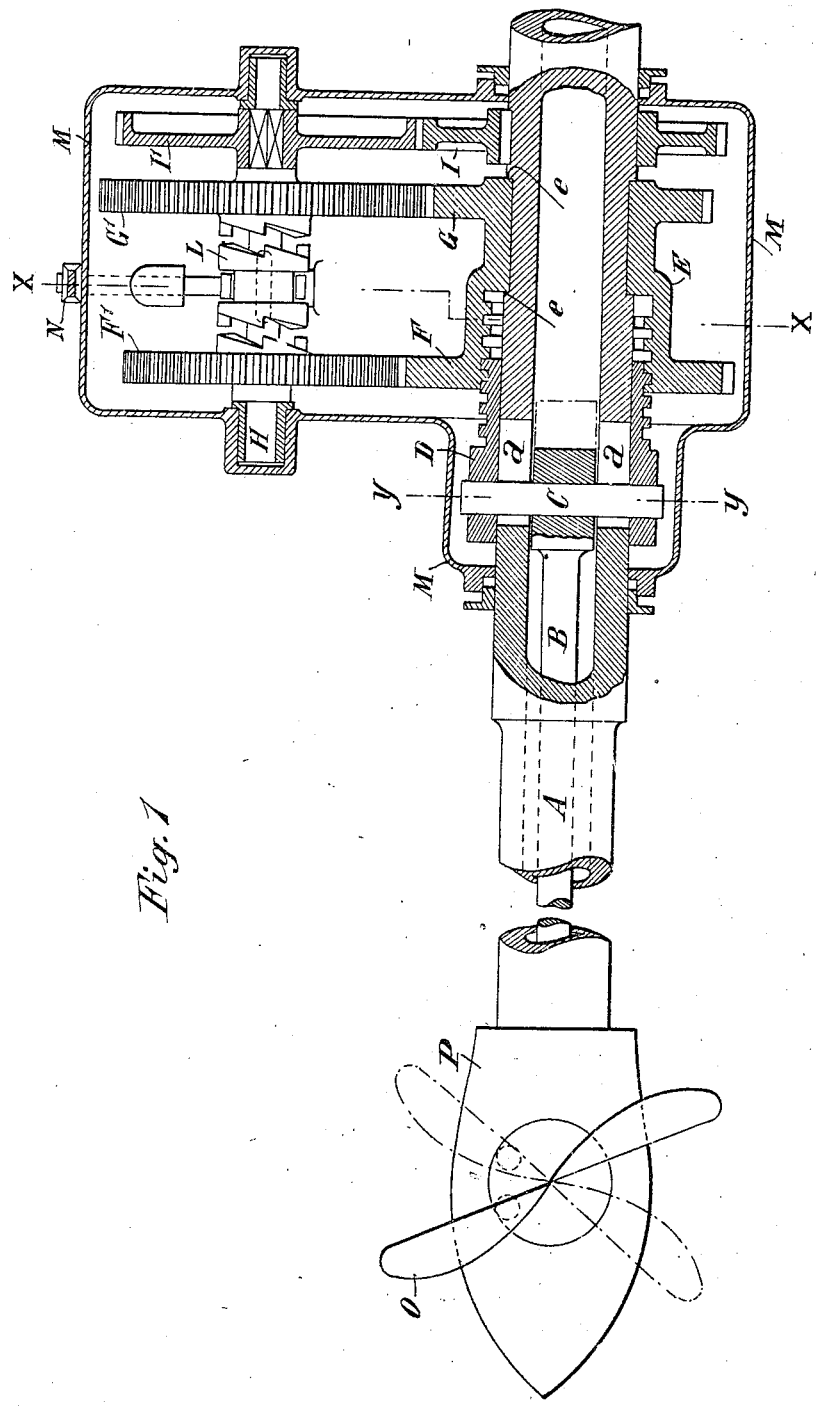

C. SACERDOTI.
ADJUSTING DEVICE FOR REVERSIBLE SCREW PROPELLERS.
APPLICATION FILED MAY 22, 1915.

1,190,328.

Patented July 11, 1916.
2 SHEETS—SHEET 1.

WITNESSES:
Frank H Logan
John H Hoving

INVENTOR:
CESARE SACERDOTI
BY: H van Deventer
ATTORNEY.

C. SACERDOTI.
ADJUSTING DEVICE FOR REVERSIBLE SCREW PROPELLERS.
APPLICATION FILED MAY 22, 1915.
1,190,328.
Patented July 11, 1916.
2 SHEETS—SHEET 2.
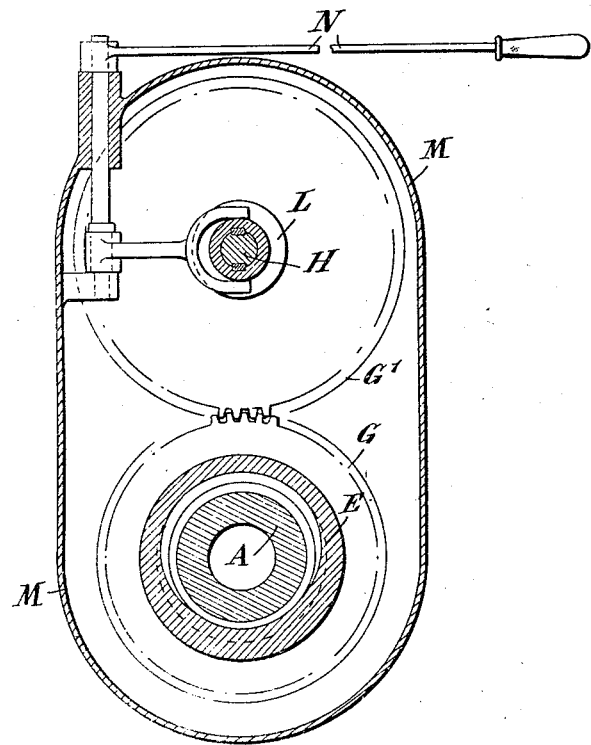
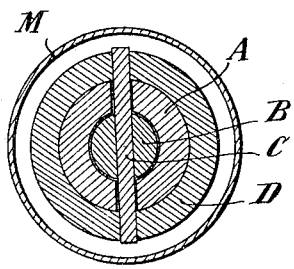
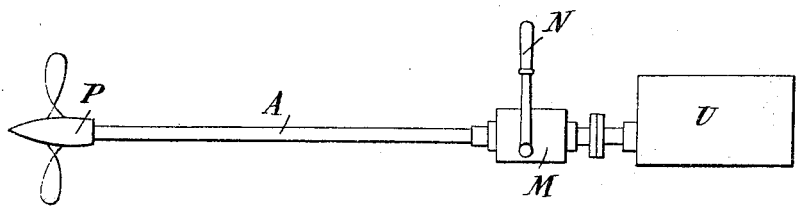
Witnesses:
Frank H. Logan
John H. Herring
Inventor:
Cesare Sacerdoti
By: [signature]
Attorney

UNITED STATES PATENT OFFICE.

CESARE SACERDOTI, OF GENOA, ITALY, ASSIGNOR TO SOCIETA ANONIMA ITALIANA GIO. ANSALDO & C., OF GENOA, ITALY.

ADJUSTING DEVICE FOR REVERSIBLE SCREW-PROPELLERS.

1,190,328. Specification of Letters Patent. Patented July 11, 1916.

Application filed May 22, 1915. Serial No. 29,940.

*To all whom it may concern:*

Be it known that I, CESARE SACERDOTI, a subject of the King of Italy, residing at Geona, Italy, (whose post-office address is Via Corsica N. 10, Genoa, Italy,) have invented certain new and useful Improvements in Adjusting Devices for Reversible Screw-Propellers, of which the following is a specification.

My present invention has for its object a device for effecting, even at a distance, the adjusting of a reversible rotary blade screw propeller, the power necessary for the operation of my said driving device being derived from the driving shaft itself.

The purpose of the said device is to completely eliminate the known inconveniences of the adjusting devices for reversible screw propellers such as for instance: (1) the necessity of having a thrust bearing capable of standing the traction and thrust forces transmitted by the member which effects the rotation of the blades. Such bearing involves losses of power by friction and the necessity of thorough and continuous lubricating; (2) the necessity of controlling by external means the position of such bearing, which even for none too powerful plants involves the use of an auxiliary motor for effecting the reversing operation. The problem has now become very interesting since internal combustion engines have begun to be adopted for naval purposes. Such engines owing to their lack of flexibility of operation and the practical impossibility of running them at a number of revolutions very much lower than the normal one, may be very advantageously coupled to a reversible screw propeller if the latter is rid of the above two capital defects. Furthermore, although reversible Diesel engines be built with safe reversing devices, it is generally held preferable in many cases to be in a position to resort to some other means of reversal in order to be able to command very great quantities of compressed air, or, still better, simplify and render more economical the engine by doing away with the reversing device altogether.

The device forming the object of my present invention is therefore designed for being applied to indefinitely great powers, by suppressing any fixed thrust bearing for the driving member, and deriving the power for its operation from the driving shaft itself.

My improved device has been adapted to the special case in which the rotation of the blades is effected by a rod sliding in the interior of, or rotating with the hollow driving shaft, which is the system common to all types of reversible screws at present.

In order that my said invention may be better understood I have illustrated same by way of example in the annexed drawings in which—

Figure 1 is a horizontal section passing through the driving shaft; Fig. 2 a cross section on line —$x$—$x$— of Fig. 1; Fig. 3 a cross section on line —$y$—$y$— of Fig. 1, and Fig. 4 a diagrammatical view of the whole device in which Y is the motor operating the shaft A.

In the said figures A is the hollow driving shaft in which slides the adjusting rod B of blades O. Shaft A is provided with two diametrically opposed slots —$a$—$a$— through which extends a cross-rod C fixed to the ends of rod B and rigid with a screw threaded sliding sleeve engaging a nut E loosely mounted on shaft A but prevented from axial sliding by opposed stops —$e$— —$e$—. Worm E may be rotated faster or slower with regard to the motor by two pairs of gears F F' G G', of which F and G are integral with nut E, while F' and G' are loosely mounted on a counter-shaft H driven from shaft A by a couple of gears I I' respectively keyed on A and H.

The gears are so arranged that the relation between gears I and I' is 1, that of F to F' is somewhat higher than 1, and that of G to G' somewhat lower than 1. Gears F' and G' may be made fast to shaft H by a double tooth clutch L so shaped as to be able to engage with the shaft while rotating owing to the slow relative movement between the gears and counter-shaft.

The whole of the above described device is inclosed in a casing M containing lubricating oil and from which project through stuffing-boxes only the driving shaft A and the operating lever N.

From the above it will be seen that on shifting, through lever N, the clutch L from the one side to the other, the gears mesh so that worm E is rotated more rapidly or more slowly than the driving shaft, that is to say it rotates either faster or slower with regard to the said shaft. This rotary movement is converted by the worm to a translatory back or forward movement of sleeve D; and then to a rotary movement of blades O of screw P.

After the desired variation of pitch has been obtained the clutch is restored to central position and the relative movement of the device with regard to the shaft is stopped, only the fixed and loose gears continuing to rotate, without, however, transmitting any power.

My above described adjusting device, in order to make its operation more secure and practical, may be advantageously though not necessarily completed by the following arrangements: (a) safety devices for preventing the nut E from rotating when no variation of pitch is desired, such devices being operated by the lever N so that nut E is only released at the moment of engagement of clutch L; (b) pitch limiting devices controllable from without by a secondary lever, and so connected to lever N as to prevent sleeve D from being shifted beyond a predetermined extent, because after the desired shifting has been automatically effected, clutch L is disengaged. The said members also would form a safety device for preventing sleeve D and consequently also rod B from being shifted beyond a safe limit compatible with the structure of the driving device, the greatest admissible range of rotation of blades, and the maximum load to be put on the motor, etc.; (c) a pitch indicator mechanically connected to sleeve D, and such as to transmit the movements imparted to the latter to an outer indicator so as to indicate outside the variations of pitch which have been effected; (d) a stationary hand operated device for effecting the desired variations of pitch by hand before starting the motor if at the beginning of movement the blades are not in the desired position; (e) a device for shifting clutch L by pressure of oil, water, air or other fluid so that such shifting may be effected from a distance in such a way that even for great powers the operation of the device may be effected easily and without any effort by the operator, and furthermore a device for obtaining that the pitch varying operation is effected in the one or the other direction according to the direction in which the adjusting member is shifted and to an extent proportional to the shifting.

From the above it will be seen that my improved drive is distinguished by the following features: (1) The power for operating the adjusting drive when the position of blades is to be varied is derived from the driving shaft. (2) The power for operation and the power which during the movement is to be overcome in order to keep the blades at the desired pitch is taken up by the driving shaft A thus acting between parts without relative movement, thereby dispensing with the use of a thrust bearing which would be otherwise indispensable. (3) Owing to the arrangement mentioned at (2) the friction losses are reduced and greater mechanical efficiency obtained, besides which wear, the possibility of damages, the necessity of lubricating and vigilance are materially reduced. (4) Even for very great powers the device can be easily and rapidly operated from a great distance.

Having now described my said invention and the manner in which it is to be performed, I claim:

An adjusting device for reversible screw propellers comprising, in combination, a casing containing oil, a hollow driving shaft and an operating lever extending from said casing, the said lever being adapted to operate, at a distance, a reversible screw propeller with rotary blades by deriving the necessary power from the hollow driving shaft, two diametrically opposed slots in said hollow shaft, a cross rod passing through them so as to protrude, a blade operating rod sliding in the bore of the driving shaft, said cross-rod being fixed to the end of the blade operating rod, and fast with a slidable screw threaded sleeve engaging with a nut loosely mounted on the driving shaft but prevented by stops from being shifted axially, the said nut being adapted to rotate faster or slower with regard to the driving shaft by two pairs of gears two of which latter are fast with the nut, and the other two of which are loosely mounted on a countershaft receiving its movement from the driving shaft by a couple of gears respectively keyed on the driving shaft and countershaft, the loose gears being adapted to be made fast with the said counter-shaft by a double tooth clutch.

In testimony whereof I have signed my name to this specification in presence of two subscribing witnesses.

CESARE SACERDOTI.

Witnesses:
 LUIGE BENVENULE,
 FRANCESCA BARBER.